(12) United States Patent
Iacobucci

(10) Patent No.: US 11,021,252 B2
(45) Date of Patent: Jun. 1, 2021

(54) COMPACTOR TROLLEY FOR AERONAUTICAL APPLICATIONS

(71) Applicant: Iacobucci HF Aerospace S.p.A., Ferentino (IT)

(72) Inventor: Lucio Iacobucci, Ferentino (IT)

( * ) Notice: Subject to any disclaimer, the term of this patent is extended or adjusted under 35 U.S.C. 154(b) by 114 days.

(21) Appl. No.: 16/340,361

(22) PCT Filed: Oct. 6, 2017

(86) PCT No.: PCT/IB2017/056184
§ 371 (c)(1),
(2) Date: Apr. 8, 2019

(87) PCT Pub. No.: WO2018/069802
PCT Pub. Date: Apr. 19, 2018

(65) Prior Publication Data
US 2019/0241268 A1     Aug. 8, 2019

(30) Foreign Application Priority Data

Oct. 10, 2016   (IT) .................... 102016000101331

(51) Int. Cl.
| | |
|---|---|
| *B65F 1/14* | (2006.01) |
| *B64D 11/00* | (2006.01) |
| *B30B 9/30* | (2006.01) |
| *B64D 11/04* | (2006.01) |

(52) U.S. Cl.
CPC ........ *B64D 11/0007* (2013.01); *B30B 9/3032* (2013.01); *B30B 9/3042* (2013.01); *B64D 11/04* (2013.01); *B65F 1/1405* (2013.01); *B65F 1/1426* (2013.01); *B65F 1/1473* (2013.01);
(Continued)

(58) Field of Classification Search
CPC ....... B30B 9/30; B30B 9/3003; B30B 9/3032; B30B 9/3042; B65F 1/1405; B65F 1/1473; B65F 1/1425; A47B 88/42; A47B 88/427; A47B 88/4235; A47B 88/483;
(Continued)

(56) References Cited

U.S. PATENT DOCUMENTS 3,658,394 A * 4/1972 Gutner .................. A47B 88/57
384/21
3,831,513 A * 8/1974 Tashman .................. F16P 3/04
100/52
(Continued)

FOREIGN PATENT DOCUMENTS

| | | | |
|---|---|---|---|
| EP | 0247879 | 12/1987 | |
| EP | 1449639 | 8/2004 | |
| WO | WO-2012030881 A1 * | 3/2012 | ......... B64D 11/0007 |

OTHER PUBLICATIONS

HettichEnglish, Quadro runners with slide-on installation for wooden drawers, made by Hettich, https://www.youtube.com/watch?v=ui49wsAorCU&feature=emb_logo (Year: 2012).*

*Primary Examiner* — Adam J Eiseman
*Assistant Examiner* — Bobby Yeongjin Kim
(74) *Attorney, Agent, or Firm* — Themis Law

(57) ABSTRACT

A compactor trolley for aeronautical applications, more particularly a trolley provided with a drawer having a door with a safety closing system that incorporates a flap for direct access to the waste storage compartment, without the need to pull out the drawer and/or open the door.

8 Claims, 9 Drawing Sheets

(52) U.S. Cl.
CPC ... *B65F 2210/148* (2013.01); *B65F 2210/168* (2013.01)

(58) Field of Classification Search
CPC .............. A47B 88/57; A47B 2088/421; A47B 2210/0016; A47B 2210/0018; A47B 2210/0056
See application file for complete search history.

(56) References Cited

U.S. PATENT DOCUMENTS

| | | | | |
|---|---|---|---|---|
| 4,018,148 A | * | 4/1977 | Wolbrink | B30B 9/3032 100/345 |
| 4,073,228 A | | 2/1978 | Henzl | |
| 4,719,852 A | | 1/1988 | Durbin | |
| 4,832,509 A | * | 5/1989 | Merrifield | A47B 88/40 384/21 |
| 5,218,900 A | * | 6/1993 | Elliott | B30B 9/3003 100/229 A |
| 7,089,852 B2 | * | 8/2006 | Lacobucci | B30B 9/3064 100/100 |
| 2009/0314169 A1 | * | 12/2009 | Kachkovsky | B30B 1/103 100/229 A |
| 2015/0101499 A1 | * | 4/2015 | Hitchcock | B30B 1/16 100/229 A |

* cited by examiner

COMPACTOR TROLLEY FOR AERONAUTICAL APPLICATIONS

FIELD OF THE INVENTION

The present invention relates to a compactor trolley for aeronautical applications, more particularly a trolley provided with a drawer having a door(s) with safety closing system which incorporates a flap for direct access to the waste storage compartment, without the need to pull out the drawer and/or open said door.

PRIOR ART

In view of the particularly strict safety standards stipulated in the aviation sector with regard to the closing systems fitted to panels, doors and shutters, the present invention aims to solve the problems associated with the use of trolleys for the efficient collection of waste inside an aircraft.

Furthermore the aviation sector is also characterized by very stringent technical and weight-related requirements as regards the materials to be used in this sector. A high mechanical strength and impact resistance, low toxicity and low inflammability are some of the required characteristics, although these are properties associated with materials which have a high specific weight, such as metals. The use of materials with a high specific weight in the aviation sector, however, reduces the load capacity of the aircraft and it is therefore one of the most important variables to be taken into consideration when choosing materials for the construction of components of parts and devices for aeronautical use.

Compactor trolleys known to the inventors have either drawers with a fixed frontal part, as described in EP1449639 and U.S. Pat. No. 4,073,228, or they have doors with hatches mounted on the cover of the trolley as described in EP0247879. There is no trolley known to the inventors or described in the prior art that has the combination of a drawer having a door including a hatch.

The present invention proposes a compactor trolley which solves the aforementioned problems by means of the provision of a compactor trolley which is safe and easy to use and suitable therefore for use in the aviation sector, since it satisfies the stringent standards in this application sector.

SUMMARY OF THE INVENTION

The present invention therefore relates to a compactor trolley which has a parallelepiped structure suitable for being housed inside a galley, is provided with wheels for movement thereof and is provided with a compaction device located in the front top zone of the trolley and with an extractable drawer. Said extractable drawer may contain one or two boxes for collection of the waste, and one of them, in particular the one located opposite the compaction plate, is accessible at the front and from above for collection of the waste.

Therefore, the extractable drawer is divided into two compartments by means of a dividing wall and each of the two compartments may house a waste storage box and, on the front of the extractable drawer, opposite the front compartment and corresponding box on which the compaction plate of the compaction device may operate, there is formed an opening, below also called "flap", which provides access to the waste storage compartment, said waste storage compartment being accessible also from above when the drawer is extracted, even only partially.

Further objects will become clear from the detailed description of the invention below, with reference to preferred embodiments, it being understood however that variations are possible without departing from the scope of protection defined by the accompanying claims and with reference to the figures in the accompanying drawings.

DETAILED DESCRIPTION OF THE INVENTION

Figure 1:
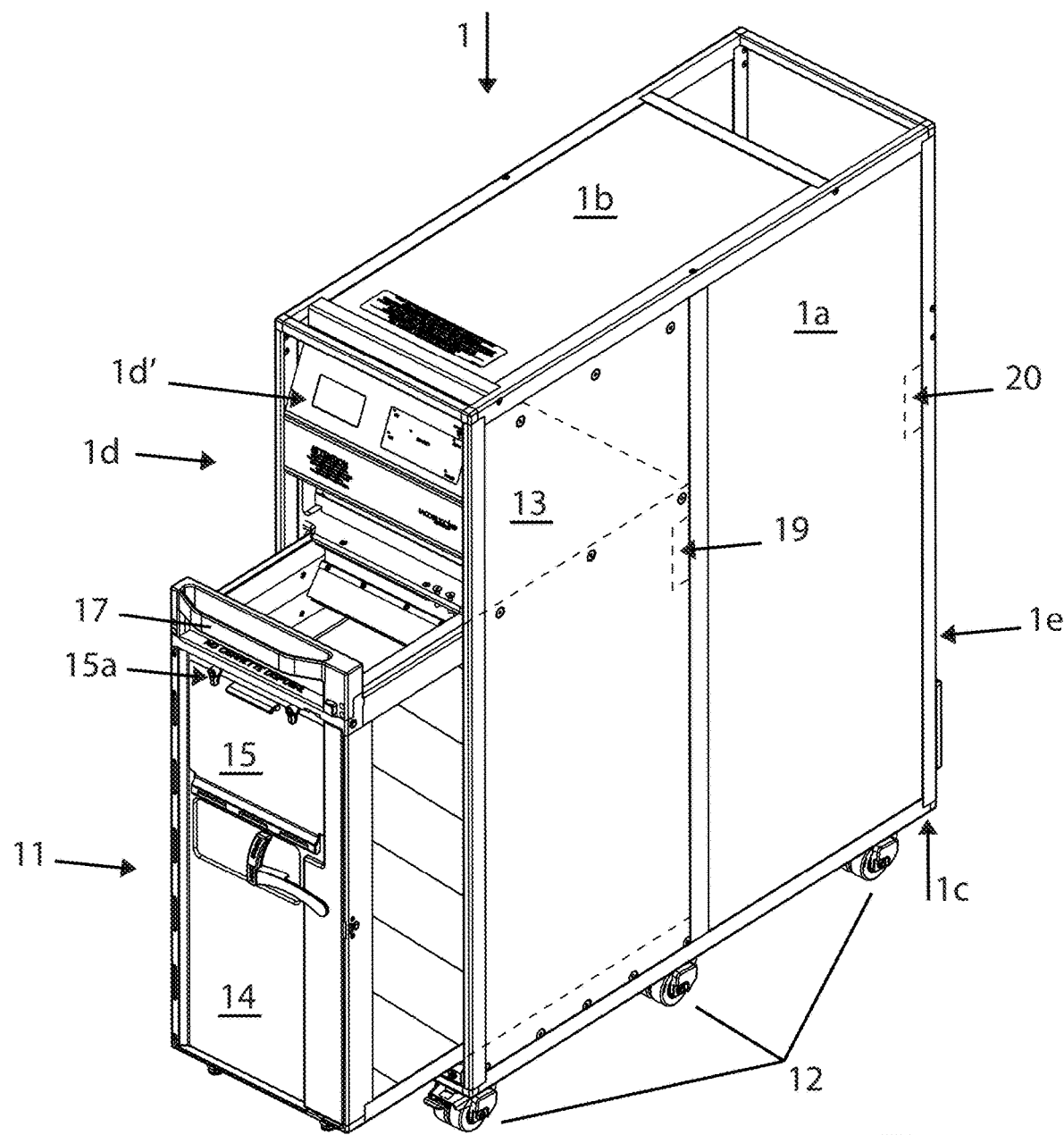
FIG. 1 shows a perspective view from above of the compactor trolley according to the invention with the drawer partially extracted.

The invention relates to a compactor trolley which has a parallelepiped structure suitable for being housed inside a galley, is provided with wheels for movement thereof and is provided with an extractable drawer. The compactor trolley is so defined since, in its top part, at the front, it is provided with a compaction device equipped with a plate for compaction of the waste, which can be operated by means of controls located on the front control panel of the compactor trolley, above the extractable drawer.

The compactor trolley according to the invention may be made with the same dimensions as a food trolley (both in the half-size version and full-size version, i.e. known designations). The compactor trolley is provided with:

a supporting structure an electromechanical compaction system a drawer (completely removable for cleaning and maintenance operations) designed to house the boxes used for waste collection.

The power supply voltage necessary for operation thereof is usually 115 V ac 400 Hz (but with suitable modification it may operate at other voltages such as 220 V ac 50 Hz) and the consumption is about 400 VA.

It is provided with a microcontroller system for controlling the operating logic which allows maximum operational flexibility and complete control over all the operations performed; among other things it is necessary to carry out in real time an autodiagnostics test and, if necessary, indicate the outcome thereof on the display panel.

A further distinguishing element compared to standard commercially available machines is the use of a piezoelectric keyboard which ensures a high degree of reliability over time of the component (keyboard) which is most used by the end user.

Owing to the presence of suitable sensors (and their interface with a CPU), the compactor trolley according to the invention is able to recognise the operating state (such as whether the rubbish box is present or whether the drawer is closed) and signals it automatically on the information display, therefore providing the end user with the correct information.

The extractable drawer of the compactor trolley in the half-size version has a single compartment, whereas in the full-size version it is divided into two compartments by means of a dividing wall which may be movable and each of the two compartments may house at least one waste storage box, the waste storage box being positioned inside the first compartment or front compartment opposite the compaction device so that the compaction plate may operate inside it. The second compartment or rear compartment of the extractable drawer may house the empty boxes or boxes already filled with compacted waste.

An opening (also called "flap" below), which allows access to the waste storage compartment, is provided on the front of the extractable drawer, opposite the front compartment and the corresponding box on which the compaction plate of the compaction device may operate. This opening may advantageously be provided with a flap hinged at the top, bottom or on the side of the opening, or the flap may be provided with a sliding closure.

Another characteristic feature of the compactor trolley according to the invention is the presence in one of the side parts of the drawer, for example the right-hand side, of a movable wall provided with a locking/release system operated for example by means of a lever. This movable side wall has the function of ensuring that, once all the rubbish has been compacted, the box may be easily removed, since the box otherwise risks remaining wedged inside as a result of the thrust exerted laterally by the said rubbish once it is crushed/compacted to obtain a smaller volume.

The main characteristics of the compactor trolley according to the invention are as follows:

1) Possibility of housing inside it at least one, for example two, boxes for the rubbish (version commonly referred to as "full-size"). One box will be placed at the back of the drawer (full or empty depending on whether it has already been used or not), while the other box will be accessible by the end user, underneath the electromechanical compaction device.

2) Slidable and totally extractable drawer provided laterally with at least one movable side wall (optional) and front leaf-type door for inserting and extracting the boxes, allowing the following operations:

A) disposal of rubbish from above: the user operates a mechanical actuator which releases the drawer and pulls the drawer towards him/herself by an amount such as to allow easy disposal of the waste. The actuator allows not only release of the drawer and partial extraction thereof into a predefined position, but also allows, when necessary, freeing of the drawer so that it can be pulled out completely from the trolley;

B) disposal of the rubbish at the front: the user operates one or more opening/closing devices, advantageously of the latch (lever) type, mounted on the front door, which cause opening of a flap which opens, for example rotating laterally or upwards or downwards. At this point the user may throw the waste into the opening which has been created, without having to pull out the drawer;

C) introduce and/or extract at the front and/or laterally the boxes which are empty or full of compacted or uncompacted rubbish;

D) easily clean the drawer by pulling it out fully from the drawer.

3) Electromechanical compaction system which results in a safer and more efficient product compared to that already on the market (such as hydraulic systems which have pressurised components).

4) Sensor system (both electronically controlled by a CPU and of the mechanical type) for using the product in safe conditions. The sensor system is used also so as to facilitate operation by the end user, indicating for example the need to change a waste box because it is full.

The advantages of the compactor trolley according to the invention are as follows:

it does NOT require connection to external compaction equipment since the compaction device is incorporated in the front top compartment of the trolley;

it has a first chamber and optionally a second chamber, the first chamber being a compaction chamber, while second chamber, when present, houses the boxes for collecting the rubbish, whether they be full or empty;

it has a flap provided on the front door of the drawer and designed to receive waste to be compacted without having to open the drawer;

it does NOT have any open top portion providing access inside the compaction compartment, although the waste may be loaded at the top into the partially extracted drawer.

The compactor trolley is provided with wheels and is configured for movable collection of the waste as well as stationary collection and compaction of the waste; moreover the compaction device is integral with the trolley inside which an extractable drawer slides and is not a simple compartment of a fixed support structure inside which a trolley is arranged.

The compactor trolley:

may have internal parts made of metals and metal alloys, in particular aluminium and steel; advantageously the compaction chamber is made of a strong material and the storage chamber (for the empty or full boxes to be compacted) may be made using lighter materials such as aluminium and plastics or composite materials;

a kind of tray for containing any liquids is provided;

in the full-size version it has a second chamber for housing at least one box which is empty or full of rubbish already compacted or to be compacted;

in the full-size version it has a first chamber and second chamber divided by a movable dividing wall which may be opened and closed so as to move a cardboard waste box from the first chamber to the second chamber and vice versa;

the first chamber and the optional second chamber are formed in an extractable drawer of the compactor trolley and are NOT integral therewith, as instead indicated in the prior art.

With reference to the method for collecting and compacting waste on-board an aircraft with the compactor trolley according to the invention, said method has the following advantages:

a first and second compaction chamber are NOT provided such that, once the first box has been filled and undergone compaction, it is required to remove and reposition the drawer for filling and compaction of the second chamber;

the possibility of having a drawer with two separate compaction zones is NOT envisaged because compaction is performed solely in the first of the two chambers, while the second chamber is used only for positioning the empty boxes or the boxes with already compacted waste;

it is likewise NOT envisaged having to position the trolley underneath an external device to perform compaction, since the compaction device forms an integral part of the trolley and is not arranged on a separate support structure.

DESCRIPTION OF A PREFERRED EMBODIMENT OF THE INVENTION

With reference to the attached FIGS. 1 to 5, these show a preferred embodiment of the compactor trolley according to the invention.

The compactor trolley 1 for collection and compaction of the waste has a substantially parallelepiped form and is formed by a rigid structure with side walls 1a, a top wall 1b and bottom wall 1c, and two other walls: a front end wall 1d and rear end wall 1e. The compactor trolley 1 is provided with wheels 12 for allowing it to be moved and is provided internally with a compaction device 57 positioned at the front, in the top zone 13 of the trolley, with a control panel formed in the top part 1d' of the front wall 1d.

The compactor trolley 1 further comprises an extractable drawer 11 with a first chamber and optionally a second chamber, the first chamber being a compaction chamber which houses a box 16 for collection and compaction of the waste, the second chamber, when present, being able to house waste boxes which are empty or full of compacted and uncompacted waste.

The waste storage box 16 is open at the top 16a and, partially, on one of its sides 16b. The top opening allows loading of the waste from above and compaction thereof by means of the compaction device which is present inside the trolley 1 and arranged above the box. The partial side opening 16b is arranged at the front with respect to the extractable drawer 11.

The compactor trolley may be of the full-size type and will be provided both with the first chamber and with the second chamber, while in the half-size version it will have only the first chamber, namely only the compaction chamber.

The extractable drawer 11 is provided at the front with a door 14 for inserting/extracting the waste storage boxes 16. The door 14 has a flap 15 mounted thereon, said flap being located opposite the side opening 16b of the waste storage box 16 so as to provide access from the outside to the waste storage box 16 and therefore to the first chamber or compaction chamber.

The drawer 11 is also provided laterally with at least one movable side wall 56 provided with lever locking/release systems. This at least one side wall, when present, can be opened and may be formed on only one of the sides of the box 11; it has the function, once the waste has been compacted inside the box 16, of ensuring easier removal of the box 16 which otherwise would risk remaining trapped owing to the thrust exerted laterally by the said waste, once it is compressed/compacted in order to reduce its volume.

The drawer 11 is also provided at the front with a handle 17, or other similar device, for partial or total extraction of the drawer from the rigid structure of the trolley 1. By means of the operation of partial extraction of the drawer 11 from the trolley 1 using the handle 17 the open top portion 16a of the waste storage box 6 is made accessible to an operator so that the waste may also be thrown into the said drawer from the top, as well as frontally. The open top portion 16a of the waste storage box 16 also allows the downward movement of the compaction plate of the compaction device, for performing compaction of the waste inside the box 16.

The drawer 11 which houses the boxes 16 of waste of the compactor may also be completely extracted from the compactor trolley 1, favouring, for example, the possibility of performing cleaning of the part without the need to remove the whole compactor from the aircraft (or in any case from the environment where it is installed).

The trolley 1, owing to the presence of the wheels 12, allows mobile collection and compaction of the waste.

The flap 15, housed inside a corresponding open recess of the door 14, may be made so as to be hinged at the top, bottom or laterally inside said open recess and may be able to be opened towards the inside or outside of the trolley 1 with opening through an angle of between 20° and 180°. The flap may also be provided with safety closing systems, for example of the latch type 15a.

Figure 2:
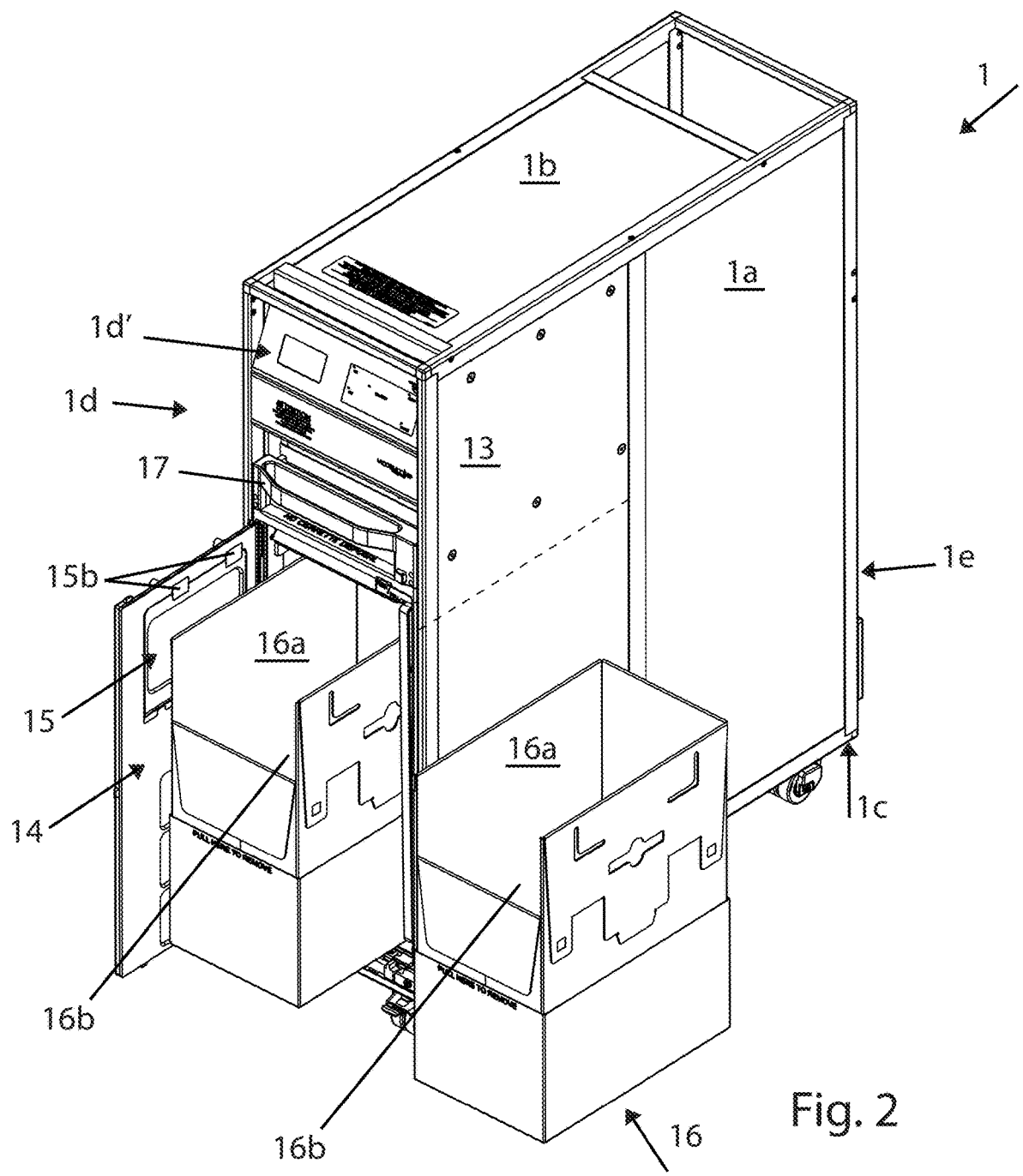
FIG. 2 is the same view as FIG. 1 with the drawer fully inserted the trolley, the door open and a waste storage box partially extracted.
Figure 3:
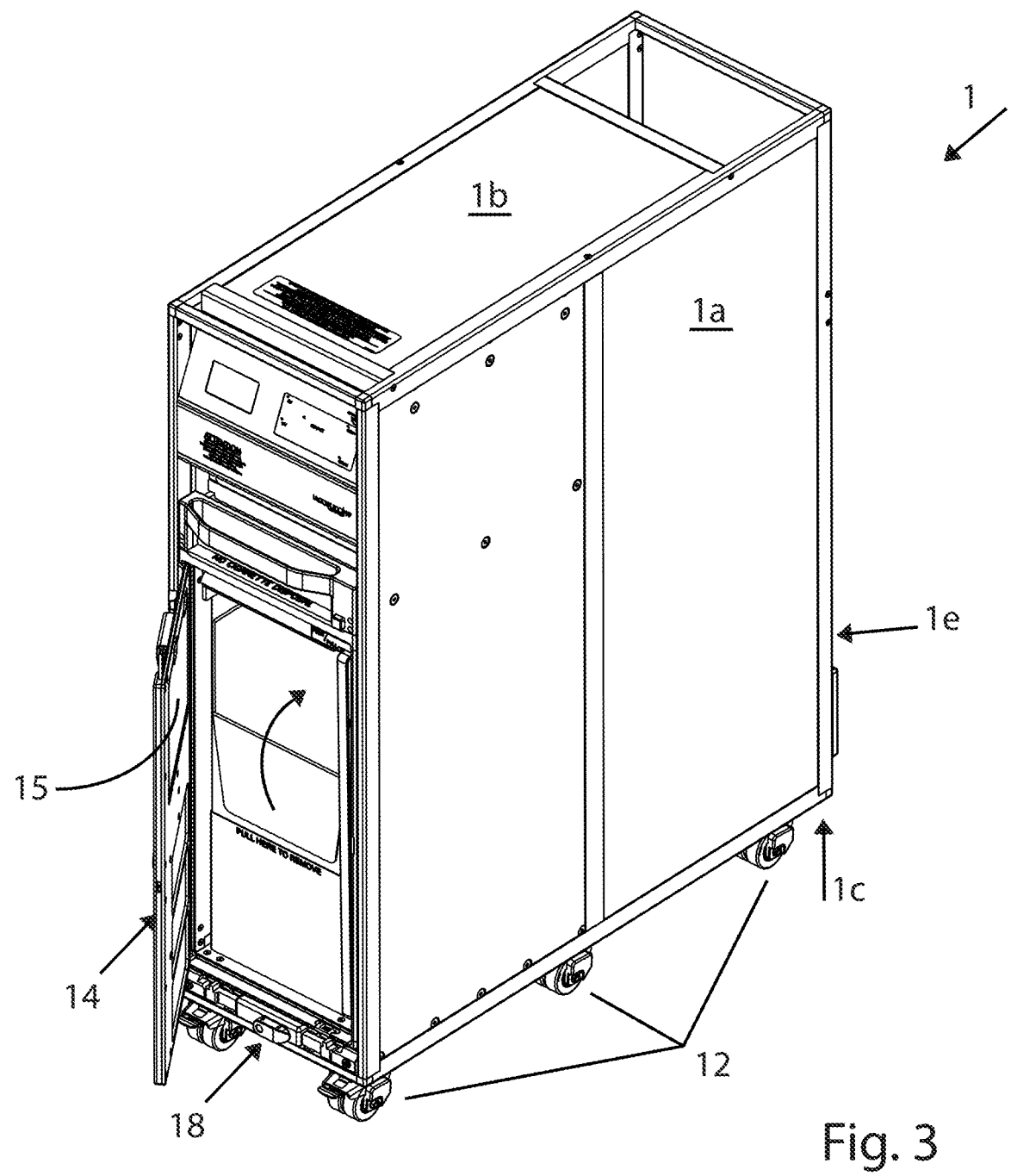
FIG. 3 is the same view as FIG. 2 with the drawer fully inserted the trolley, the door open and the waste storage box fully inserted inside the drawer.

The flap 15 can also be provided with sensors 15b of the magnetic, electromechanical, optical, inductive and similar kind as shown in FIG. 2, to guarantee the safety of the operator in the compacting operation.

The door 14 may also be provided with safety closing systems 18, for example of the latch type.

The compactor trolley 1 may be advantageously provided with fixed safety contacts 19, 20, for example of the mechanical disengaging type, for checking the correct position of the drawer 11 for the purposes of correct operation of the compactor.

FIGS. 6-10 show a possible embodiment of the mechanical system suitable for making the drawer 11 completely extractable (FIG. 7), this embodiment being valid both for the full-size compactor trolley and for the half-size trolley.

Figure 6:
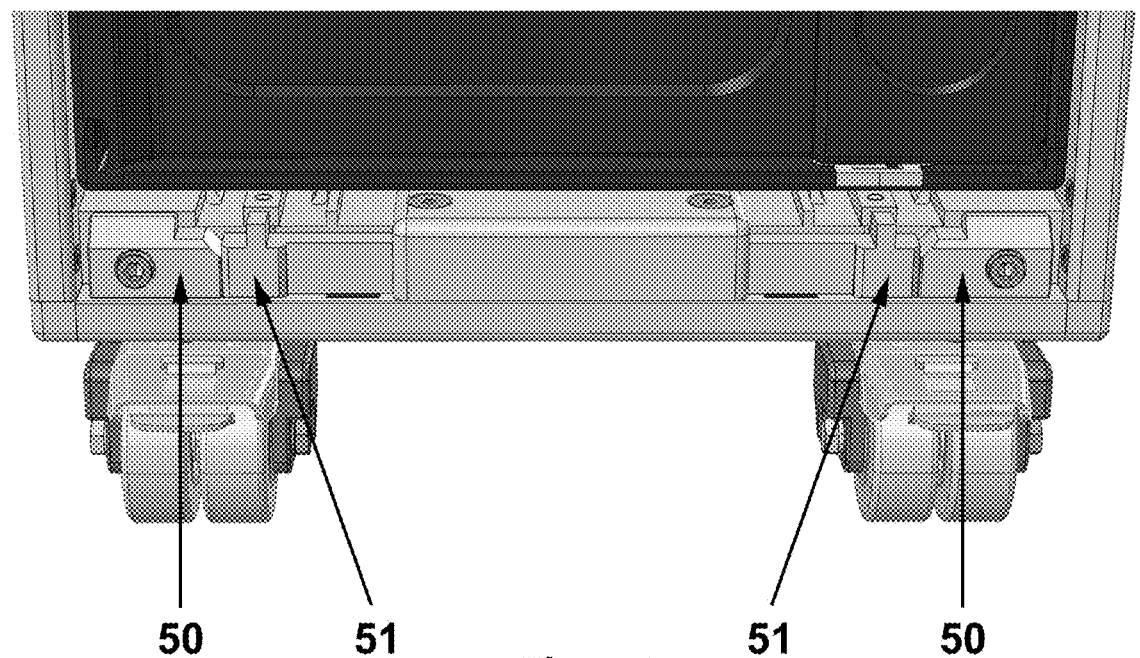
FIG. 6 shows in schematic form the system for locking the drawer to the compactor trolley.
Figure 7:
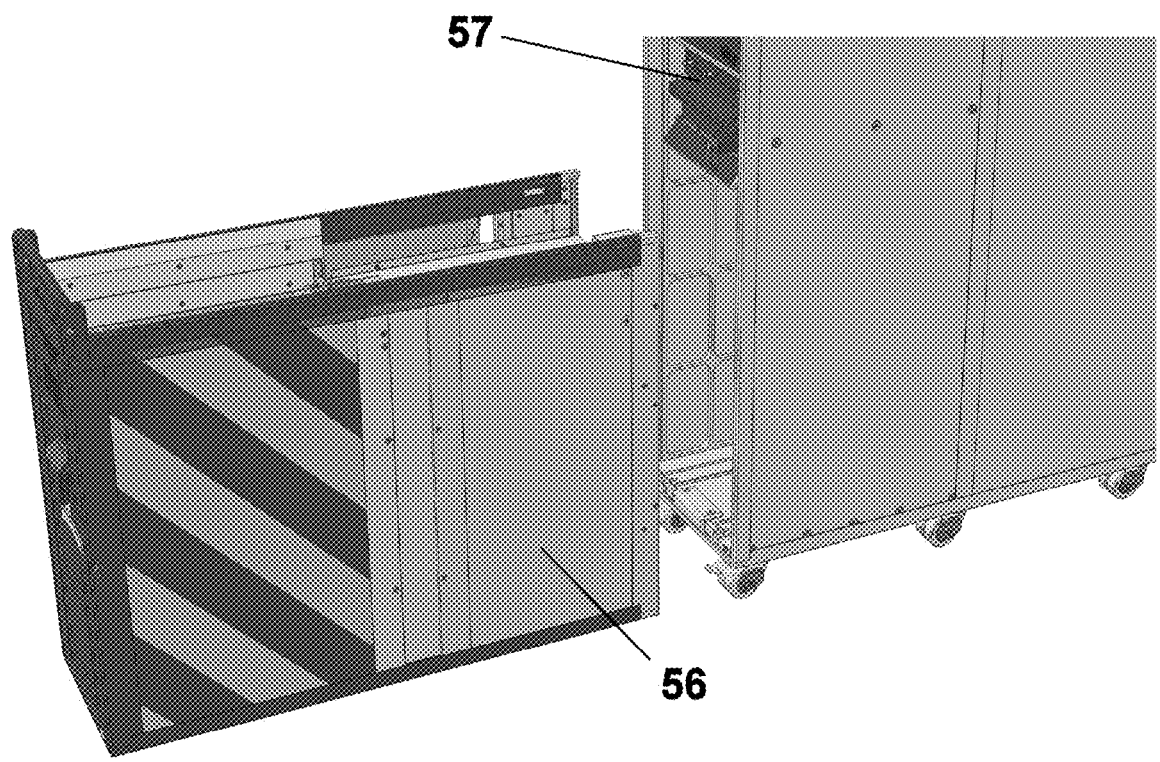
FIG. 7 is the same view as FIG. 1 with the drawer completely extracted.

With particular reference to FIG. 6, fastening devices 50 and 51 for fastening the drawer 11 to the compactor trolley 1 are provided on the outer edge formed between the front wall 14 and the bottom of the drawer 11. These fastening devices 50 and 51 free or lock the sliding movement of the drawer 11 along the track system described below.

Figure 8:
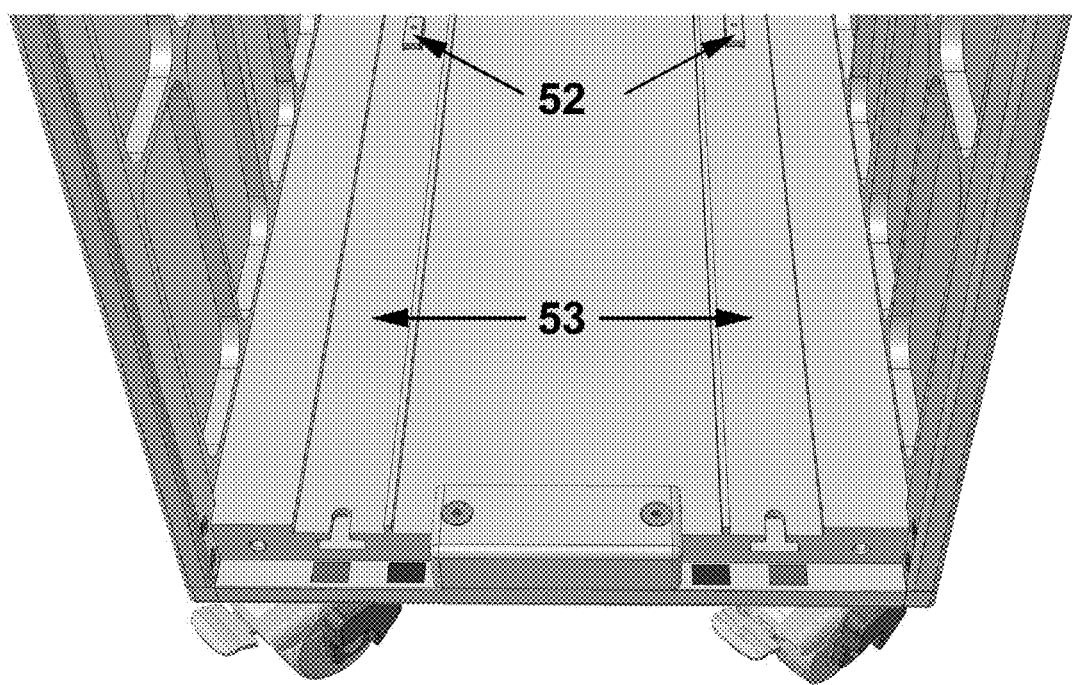
FIG. 8 shows in schematic form a partial perspective view of the base of the trolley.

With particular reference to FIG. 8, this shows in schematic form a partial perspective view of the inner surface of the base 1c of the compactor trolley 1 on which the tracks 53 (at least one, preferably two) provided with first mechanical stops 52 are formed.

Figure 9:
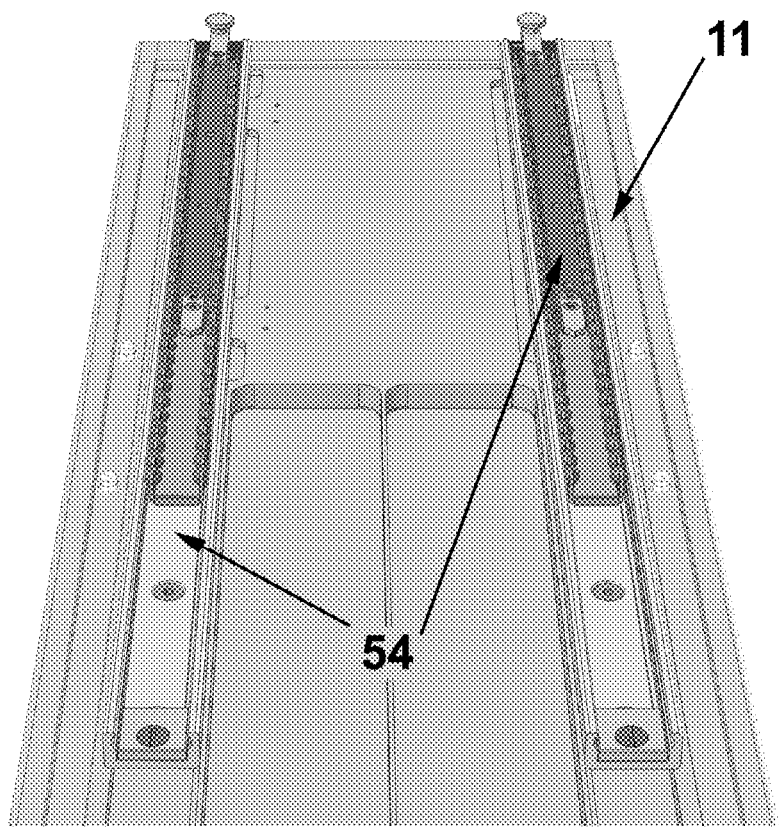
FIG. 9 shows in schematic form a partial perspective view of the telescopic guides located on the bottom of the drawer.
Figure 10:
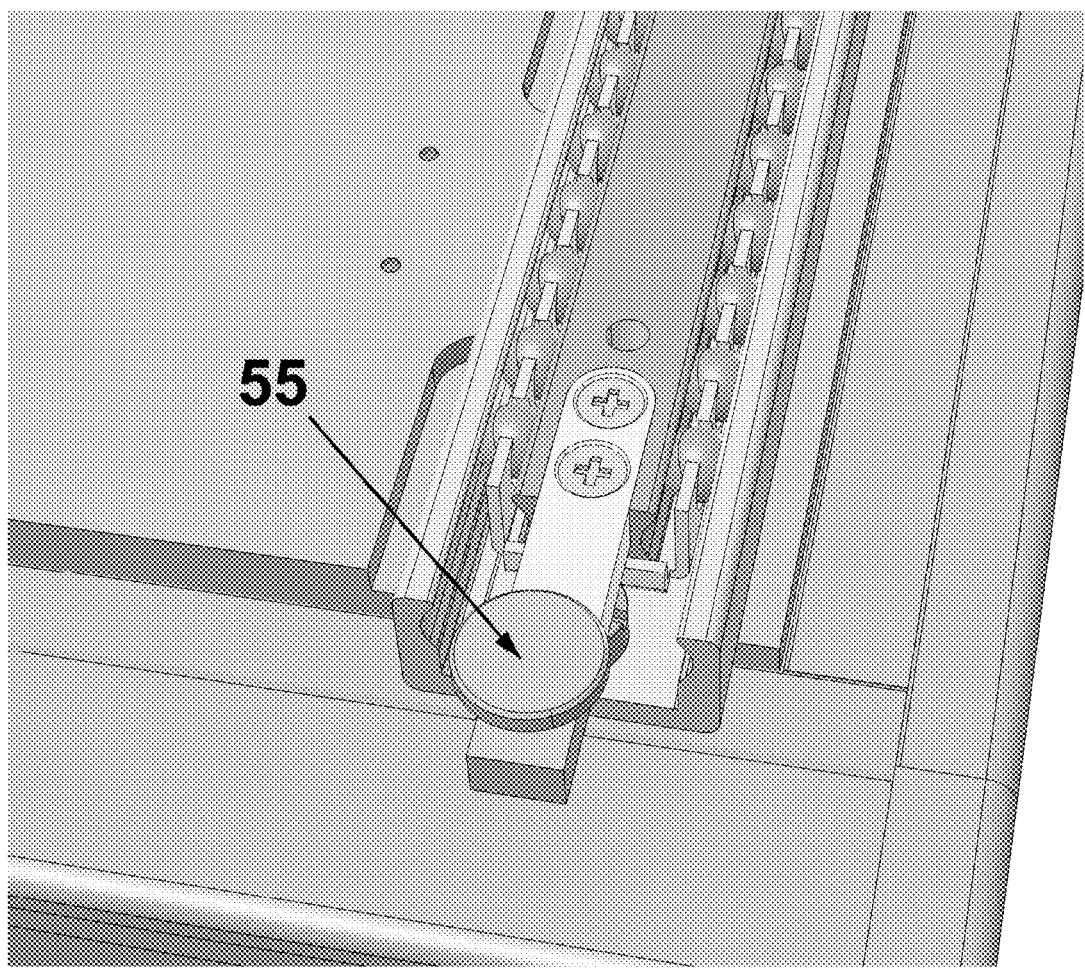
FIG. 10 shows in schematic form the locking device of one of the guides according to FIG. 9.

With particular reference to FIG. 9, this shows in schematic form a partial perspective view of the bottom of the drawer 11, provided with at least one telescopic guide 54, preferably two guides, suitable for sliding inside the corresponding tracks 53, with an end-of-travel stop defined by the first mechanical stops 52 and by second mechanical stops 55.

The operating principle of the compactor trolley is now described.

Figure 4:
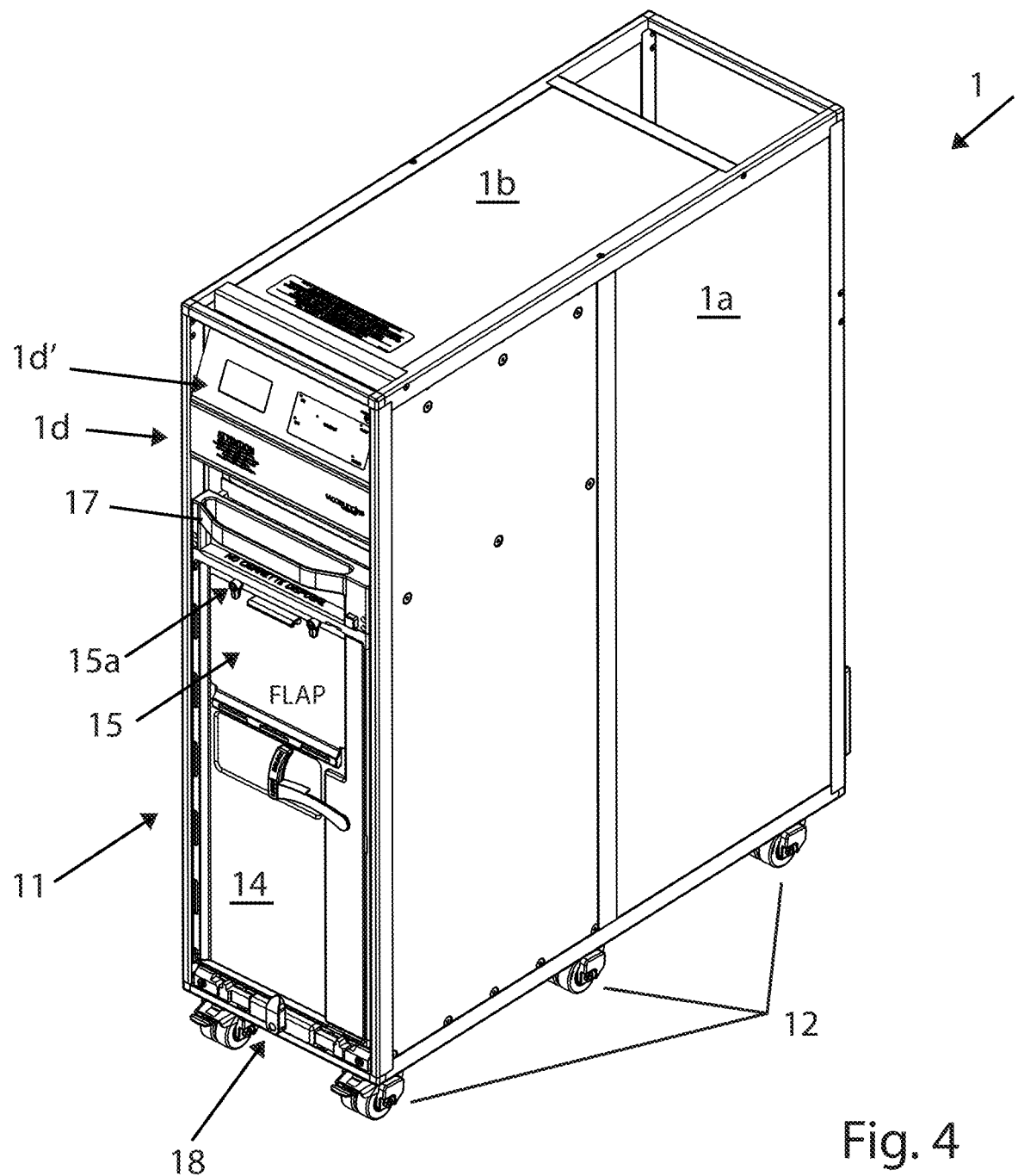
FIG. 4 is the same view as FIG. 3 with the door closed and the flap for access to the box also closed.
Figure 5:
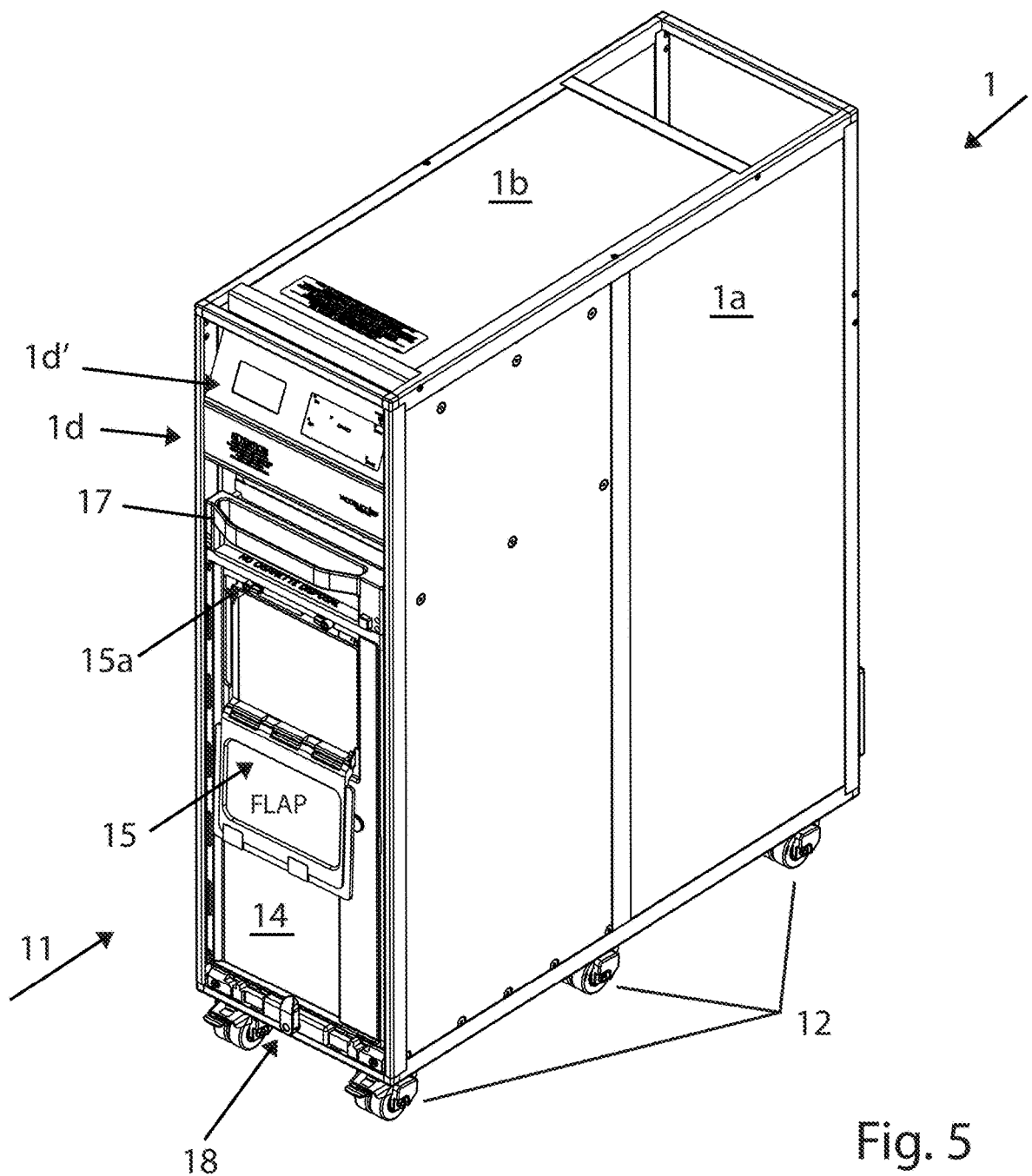
FIG. 5 shows the same view as FIG. 4 with the flap for access to the box open.

Starting with the trolley 1 in the condition shown in FIG. 4, the user opens the door 14 by operating the associated handle and inserts the box 16, optionally operating the latch 18, if necessary. Once the door 14 is closed, the compactor 1 is ready for operation. When there is rubbish which needs to be thrown away, the user may choose one of the following methods:

1) Waste Disposal from Above

Pull out using the handle 17 the drawer 11, released by means of the associated button/actuator;

Throw the waste into the box 16 from above through the opening 16a;

Close the drawer again 11. At this point he/she may press the button on the front panel (zone 1d') so as to activate the compaction device for the compaction operation and, if all the operational/safety conditions are satisfied, i.e.:
- door 14 closed
- flap 15 closed
- drawer 11 fully inserted inside the compactor trolley 1 and fixed safety contacts 19 and 20 in contact with each other,
- box 16 present
- space inside the box not used up (signalled on the display present on 1*d*')
- dividing wall optionally movable between the first and second compaction chambers of the drawer 11 in closed position (only in full-size version)

the electromechanical compaction actuator is operated so that it presses against the rubbish and compacts it.

2) Waste Disposal at the Front

Open the flap 15 after unlocking it by operating the safety latches, throw the waste into the opening which is created (zone 16*b* of the box), close the flap 15, operating the latches again. At this point the user presses the compaction button on the front panel (zone 1*d*') and, if all the operational/safety conditions are satisfied, i.e.:
- door 14 closed
- flap 15 closed
- drawer 11 fully inserted inside the compactor trolley 1 and fixed safety contacts 19 and 20 in contact with each other,
- box 16 present
- space inside the box not used up (signalled on the display present on 1*d*')
- dividing wall optionally movable between the first and second compaction chambers of the drawer 11 in closed position (only in full-size version)

the electromechanical compaction actuator is operated so that it presses against the rubbish and compacts it.

The user may repeat these operations for as long as the box 16 is not full.

It is important to note that the drawer 11 may be completely removed from the structure 1 for cleaning and maintenance operations, this because, being the part which most comes into contact with the rubbish, it has been especially designed such that it can be removed and "handled" separately from the rest of the structure.

Extraction of the drawer involves the following operations:
assuming that the compactor is in the condition shown in FIG. 4, in order to remove the drawer, the operating procedure is as follows:
- Operate the safety latch 18 in order to release the drawer 11
- Release both the fastening systems 50 and 51 which fasten the drawer 11 to the compactor trolley 1
- Pull the drawer 11 outwards with the aid of the handle 17
- Continue to pull out the drawer 11 until it is completely removed from the compactor trolley 1.

In order to reposition the drawer 11 the reverse procedure is performed.

Total extraction of the drawer 11 is made possible by the presence of the at least one track 53 and the at least one stop 52 provided on the inner surface of the base 1*c* of the compactor trolley 1. The track or tracks 53 allow sliding of the at least one telescopic guide 54 mounted on the bottom of the drawer 11, resulting in a guided movement and simple fixing. More specifically, fixing at the front is possible owing to the presence on the telescopic guides 54 of a mechanical stop 55 which is locked by the fastening systems 50 and 51.

Correct and efficient operation of the compaction device is ensured by means of a control panel (the part indicated as 1*d* and 1*d*' is the front part of the control panel) which interfaces with an electronic section managed by a microprocessor with software. In this way it is possible to manage the various steps for use of the trolley in combination with those of the compactor, by suitably coordinating the compaction functions. Moreover, the control display may show information such as the number of cycles and the operating hours and/or other information useful for operation and maintenance of the compactor. Control of operation of the compactor trolley is furthermore ensured by means of the use of suitably positioned sensors, which may be, for example, of the microswitch, optical, magnetic or other type. These sensors allow adjustment of activation of the compaction function and ensure operation of the machine in total safety.

Advantageously, operation of the compactor trolley is assisted by sensors which also provide information about the amount of rubbish which is present in the waste storage box.

The compactor trolley according to the invention, owing to the combination of the components which form it, is very compact, modular, light and efficient from the point of view of electric power consumption. It is also in compliance with the existing aviation regulations.

The compactor trolley according to the invention may be made of any material having the necessary strength characteristics. In particular, for use in the aviation sector, light metallic alloys, such as aluminium alloys or composite materials with low inflammability and toxicity, known per se, are preferred.

With regard to the above, a preferred embodiment of the invention has been described, although the invention is not limited in any way to the characteristics described. Persons skilled in the art will understand that, in the light of what is disclosed here, modifications and variations may be made without thereby departing from the scope of the present invention as defined by the accompanying claims.

The invention claimed is:

1. A compactor trolley for aeronautical applications, having a parallelepiped structure and comprising:
   - a plurality of wheels;
   - a compaction device arranged in a front top zone of the compactor trolley; and
   - a drawer that is extractable from the compactor trolley and contains at least one waste collection box, which is open at a top, has a side opening, and is arranged to have the top opposite to the compaction device,
   - wherein said drawer is provided at a front with a door, on which a flap is mounted and arranged opposite the side opening of the waste collection box,
   - wherein a bottom of the drawer is provided with one or more telescopic guides and one or more first mechanical stops, the one or more telescopic guides each having one of the one or more first mechanical stops disposed therein;
   - wherein a base of the compactor trolley has one or more tracks shaped as longitudinal cavities defined on an inner wall of the base, a second mechanical stop being provided in each of the one or more tracks,
   - wherein the one or more telescopic guides are configured to slide in a corresponding track of the one or more tracks,
   - further comprising one or more fastening devices each configured to lock one of the one or more first mechanical stops, wherein an end-of-travel stop of the drawer toward an inside of the compactor trolley is defined by the one or more first mechanical stops engaging a rear portion of the drawer and by the one or more fastening devices each locking the one or more first mechanical stops at a front portion of the drawer to prevent a sliding of the drawer.

2. The compactor trolley according to claim 1, wherein the drawer is completely extractable until an arrangement separate from the parallelepiped structure of said compactor trolley is obtained.

3. The compactor trolley according to claim 1, wherein the drawer is provided laterally with at least one side wall which is adapted to be opened when the drawer is open.

4. The compactor trolley according to claim 1, wherein the drawer is provided at the front with a handle for partial or total extraction of the drawer from the parallelepiped structure of the compactor trolley.

5. The compactor trolley according to claim 1, wherein the compactor trolley is configured so that waste may be introduced both at a top and at a front of the compactor trolley, inside the waste collection box of the drawer.

6. The compactor trolley according to claim 5, wherein the at least one waste collection box is configured to have a side wall that is partially open, so as to facilitate a discharge of waste from the top and the side opening of the drawer into the at least one waste collection box.

7. The compactor trolley according to claim 1, wherein the flap is hinged at a top, at a bottom or on sides inside a corresponding open recess of the door and is disposed to be opened towards the inside or an outside of the compactor trolley by an angle of between 20° and 180°, the flap being also provided with a safety closing system and safety sensors actuated during compaction.

8. The compactor trolley according to claim 1, further comprising safety contacts, one of the safety contacts being attached to the drawer and another one of the safety contacts being attached to an inner wall of the compactor trolley, the safety contacts checking a correct position of the drawer within the compactor trolley.

\* \* \* \* \*